US010556669B2

(12) United States Patent
Bauer et al.

(10) Patent No.: US 10,556,669 B2
(45) Date of Patent: Feb. 11, 2020

(54) ACTUATOR ASSEMBLY

(71) Applicant: AIRBUS DEFENCE AND SPACE GMBH, Taufkirchen (DE)

(72) Inventors: Karin Bauer, Oberhaching (DE); Christian Karch, Neubiberg (DE); Markus Blechschmidt, Ismaning (DE); Alexander Heilmann, Kahl am Main (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 357 days.

(21) Appl. No.: 15/479,649

(22) Filed: Apr. 5, 2017

(65) Prior Publication Data

US 2017/0283043 A1    Oct. 5, 2017

(30) Foreign Application Priority Data

Apr. 5, 2016    (DE) .......................... 10 2016 205 620

(51) Int. Cl.
*B64C 21/04*    (2006.01)
(52) U.S. Cl.
CPC .......... *B64C 21/04* (2013.01); *B64C 2230/04* (2013.01); *B64C 2230/14* (2013.01)
(58) Field of Classification Search
CPC ..... B64C 21/04; B64C 21/06; B64C 2230/08; B64C 2230/14; B64C 2230/04; F15D 1/0095; Y02T 50/166
See application file for complete search history.

(56) References Cited

U.S. PATENT DOCUMENTS 4,285,482 A * 8/1981 Lewis ...................... B64C 9/22
244/207
5,988,522 A * 11/1999 Glezer .................... B64C 21/08
239/11

(Continued)

FOREIGN PATENT DOCUMENTS

DE    102008017963 A1    10/2009
EP      3 228 538 B1     7/2019

OTHER PUBLICATIONS

European Search Report for Application No. 17164928.8 dated Aug. 18, 2017.

(Continued)

*Primary Examiner* — Assres H Woldemaryam
(74) *Attorney, Agent, or Firm* — Jenkins, Wilson, Taylor & Hunt, P.A.

(57) ABSTRACT

An actuator assembly is capable of manipulating a fluid flowing around a flow body, the fluid being received or able to be received in a volume of at least one cavity arranged in the flow body, and the fluid passing through at least one opening in the at least one cavity during manipulation of the fluid. In this process, the volume of the at least one cavity can be changed by moving a wall portion delimiting or defining the cavity. The actuator assembly has a drive unit with at least one actuator, which executes a periodic movement over time when actuated, causing a translational movement of the wall portion delimiting or defining the cavity and the wall portion being shaped in terms the topology thereof in such a way that it is adapted to the shape of the at least one cavity with the at least one opening thereof.

22 Claims, 2 Drawing Sheets

(56) References Cited

U.S. PATENT DOCUMENTS

| | | | | |
|---|---|---|---|---|
| 6,123,145 | A * | 9/2000 | Glezer | B64C 21/08 165/104.33 |
| 6,131,879 | A | 10/2000 | Kluge et al. | |
| 6,457,654 | B1 * | 10/2002 | Glezer | B64C 21/08 239/102.2 |
| 7,246,529 | B1 * | 7/2007 | Powell | B64C 21/025 73/861 |
| 7,823,839 | B2 * | 11/2010 | Glezer | B64C 21/08 244/204.1 |
| 9,045,224 | B2 * | 6/2015 | Golling | B64C 9/16 |
| 9,073,628 | B2 | 7/2015 | Ternoy et al. | |
| 2008/0122252 | A1 * | 5/2008 | Corke | B62D 35/00 296/180.2 |
| 2009/0261204 | A1 * | 10/2009 | Pitt | B64C 21/08 244/201 |
| 2010/0043900 | A1 * | 2/2010 | Xu | F15D 1/12 137/803 |
| 2012/0153041 | A1 * | 6/2012 | Ternoy | B64C 21/04 239/102.2 |
| 2013/0277502 | A1 * | 10/2013 | Bauer | B64C 21/08 244/208 |
| 2013/0284273 | A1 * | 10/2013 | Boespflug | B64C 21/04 137/13 |
| 2013/0284294 | A1 * | 10/2013 | Golling | F15C 1/12 137/833 |
| 2013/0291981 | A1 * | 11/2013 | Lengers | B64C 21/04 137/825 |
| 2014/0103134 | A1 * | 4/2014 | Raghu | B64C 21/04 239/11 |
| 2014/0284430 | A1 * | 9/2014 | Seifert | F15B 21/12 244/204.1 |

OTHER PUBLICATIONS

European Office Action for Application No. 171649282.8 dated Jun. 15, 2018.
German Office Action for Application No. 102016205620 dated Feb. 22, 2017.

* cited by examiner

ACTUATOR ASSEMBLY

CROSS-REFERENCE TO RELATED APPLICATION

This application claims priority to German Patent Application DE 10 2016 205 620.4 filed Apr. 5, 2016, the entire disclosure of which is incorporated by reference herein.

TECHNICAL FIELD

The disclosure herein relates to an actuator assembly for manipulating a fluid flowing around a flow body, part of the fluid being able to be received in a volume of at least one cavity arranged in the flow body, and the fluid passing through at least one opening in the at least one cavity during manipulation of the fluid, the volume of the at least one cavity being able to be changed by moving a wall portion delimiting or defining the cavity at least in part, comprising a drive unit with at least one actuator, the actuator being coupled to a coupling element connected to the wall portion. The disclosure herein also relates to a flow-control device with such an actuator assembly and to a method for flow control on a flow body.

BACKGROUND

When influencing the flow behavior of fluids flowing around a flow body, such as the aerofoil of an aircraft, for example, active flow influencing by actuators is known in the art, and can be achieved by generating what are known as "synthetic jets". This name is based on the fact that the relevant actuators do not require any external fluid supply as the time-averaged net mass flux is zero, whereas the fluid momentum is not equal to zero. In this case, a flow body can be understood to mean any external aircraft parts that are exposed to a fluid flow.

For example, in the aviation field, the synthetic jets are researched and used to improve noise behavior, to improve flow behavior on the surface of the flow body in question, in other words, the aerofoil, for example, and to improve lift and manoeuvrability. In this connection, the central issue often concerns dynamic lift as the variable that keeps an aircraft in the air and the extent to which parameters such as size, weight, forces and complexity of flow control each influence flight behavior.

A synthetic jet flow can be generated in various ways in such a situation, for example, by an electromagnetic, mechanical and thermal drive force, which causes a membrane to be moved in the desired manner in each case, as a result of which the surrounding fluid is drawn into the cavity and then ejected again. The components used in such cases should be designed to be correspondingly compact and robust.

An actuator assembly of this type is known in the art from U.S. Pat. No. 9,073,628 B2, for example. However, in the actuator assembly illustrated in this document, the design of the actuator assembly and the design of the opening through which some of the fluid volume flows into or out of the cavity mean that both thermal problems and flow losses may arise if excitation of the actuator is subject to reasonable mechanical amplification. Furthermore, problems may arise with this assembly or a similar assembly as a result of excitation of undesirable vibration modes.

SUMMARY

An idea of the present disclosure is therefore to create a compact, robust, reliable and low-loss device for active flow control with minimal outlay.

Accordingly, the solution lies in an actuator assembly in which the at least one actuator executes a periodic movement over time when actuated, the movement causing a translational movement of the wall portion delimiting or defining the cavity since the actuator is coupled to the coupling element, and in which the wall portion is shaped in terms of the topology thereof in such a way that it adapts to the shape of the at least one cavity with the at least one opening thereof. As a result, when the actuator is actuated, the wall portion is manipulated indirectly in such a way as to execute a periodic movement over time which is not necessarily symmetrical. The optimized topological shape prevents flow and pressure losses inside the cavity by ensuring that the wall portion substantially recreates the geometry of the cavity and opening and is thus for example able to seal the edgeless cavity volume of the resulting jet, the distance between the movable wall portion and the cavity wall in the edge region of this volume always being less than in the opening region.

In this case, the actuator according to the disclosure herein can be operated in a low frequency range of approximately 200 Hz to 400 Hz and yet it can still be operated with a high ejection speed of approximately 100 m/s. In contrast, a high ejection speed can usually only be achieved by a high operating frequency, which would not only result in high electrical and/or thermal losses, but would also require operating significantly above the first vibration mode (associated with movement which is difficult to control and a high level of wear).

By considering the adapted topological shape, this leads to the conclusion that for the piston geometry described in the prior art at high frequencies it is not possible to completely eject the compressed air volume from the cavity due to fluid mechanics. The remaining air volume acts like a spring which further counteracts the piston force. On the other hand, according to the disclosure herein, the distance between the piston and the shoulders (shown as reference numeral 32 in the drawing figures) is designed or configured to be smaller in the edge region of the cavity than in the region of the jet opening. This eliminates the pressure losses in the edge regions of the cavity during the suction and ejection processes. The above-mentioned distance is therefore the same as the distance between the wall portion and the cavity wall.

In addition, the jet is incorporated in the geometry of the cavity when the shape is topologically adapted, unlike the prior art. As a result of the optimized flow geometry, the flow in the jet-cavity transition area is not disrupted and pressure losses are minimized.

In this case, in another embodiment of the actuator assembly according to the disclosure herein, the wall portion can be designed or configured with a substantially rigid structure. In this situation, the term "rigid" refers to the lack of flexibility of the wall portion with regard to the deformability thereof compared with a flexible membrane or diaphragm. Nevertheless, according to the disclosure herein, the entire rigid wall portion is in particular very readily movable.

In the actuator assembly according to the disclosure herein, compactness, robustness, reliability and low losses are achieved by the fact that the relevant wall portion of the cavity is not designed or configured as a flexible membrane, but instead the wall portion is rigid and designed or configured to be adapted to the shape of the cavity, and therefore forms a uniform surface portion without any discontinuities when the fluid is applied, and this shows no signs of fatigue during operation and as a result of operation. In this case, the wall portion in contact with the fluid is not subject to any restrictions with regard to the force exerted from outside, as it is itself manipulated only by indirect means and is substantially undeformed on contact with the fluid, but instead presents an extensively unyielding surface to the fluid.

Furthermore, the force exerted by a corresponding control signal is not applied directly to the wall portion as a result of indirect manipulation by the at least one actuator. When designed or configured in this way, the wall portion can meet high load requirements, even with regard to service life. This thus represents a simple and effective option for active flow control.

By way of example, the flow of fluid can be influenced by designing the actuator assembly according to the disclosure herein in such a way that the periodic translational movement over time executed by the wall portion delimiting or defining the cavity when the at least one actuator is actuated ejects the fluid more quickly than it draws in the fluid.

In another embodiment of the disclosure herein, the ejection speed may exceed the suction speed by at least 10%, and in particular by 10%-50%.

In another embodiment of the actuator assembly according to the disclosure herein, in order to transmit indirect manipulation of the wall portion to the wall portion appropriately, without delay and without any losses, the drive unit is provided with at least one support member connected to the wall portion, the at least one actuator being arranged on the support member. The support member is in turn then connected to the wall portion by at least one connecting element, for example in the form of a web, a rigid or flexible rod or another similar non-positive means, in such a way that the force applied to the support member is transmitted to the wall portion. The relevant wall portion of the actuator assembly according to the disclosure herein can thus be designed or configured as a type of pusher plate.

An actuator mechanism in the prior art consists of what is known as a piezo stack and the transmission mechanics, but this could only be operated appropriately for virtually static movements at low frequencies as this was the only way to avoid undesirable thermal effects caused by the actuator's own momentum.

However, a high power density would be required to achieve a moderate ejection speed with a low system weight. Again, in order to do this, the known piezoceramic unit would have to be operated at high frequencies. In turn, this would make it impossible to dissipate the heat arising from the actuator assembly in the prior art sufficiently, and the temperature would thus limit the system in terms of control frequency. Theoretical fixing system for the actuating mechanism leads to several vibration modes (e.g. rotational), which do not facilitate the translational movement of the piston. The system is very difficult to control as a result of these undesirable modes and these modes also lead to increased wear on the system or they may also increase the complexity of the system due to the need for additional components (guides, bearings, or similar).

In another embodiment of the actuator assembly, for reasons of expediency, to ensure that the force applied can be transmitted without any issues, and if necessary amplified, the support member may be designed or configured with at least one flat surface, on which the at least one actuator is designed or configured as a surface element, and in particular the actuator is formed on both flat sides of the support member, for example covering the majority of the surfaces. Other embodiments of the support member are also conceivable.

On account of its particular simplicity, another embodiment of the actuator assembly according to the disclosure herein may entail the at least one actuator being driven electrically and/or provided as at least one piezoelectric actuator or a plurality of piezoelectric actuators, with the result that just one power supply or just power cables from such a supply provided in the vicinity of the actuator need to be provided to supply or drive the actuators. For example the actuator may in this case be provided with one or more piezoelectric actuators, which is/are deformed when an electric voltage is applied due to the inverse piezoelectric effect, thus applying a force to the surface on which it or they is/are positioned. A plurality of such piezoelectric actuators may form a surface actuator on the surface of the support member and the force applied by the surface actuator to the wall portion can be amplified by arranging actuators on both sides of the surface. In this case, the at least one actuator can also have a direction of motion which is perpendicular to the direction of action of the rigid wall portion.

In another embodiment of the actuator assembly according to the disclosure herein, in order to generate a synthetic jet flow by a relatively simple, readily controllable movement, the at least one wall portion of the cavity executes a movement when the actuator is actuated, in particular a periodic movement over time, which is not necessarily a uniform movement during a given period, but rather a movement in which the fluid is ejected quickly and drawn in slowly. In other words, a rigid wall portion as a movable cavity wall executes a periodic movement over time instead of for example providing a flexible membrane, which is deformed unevenly. In this case, the wall portion moves periodically over time between an upper and a lower displacement point. By way of example, an electromechanical drive unit comprising piezoelectric surface actuators along with the above-mentioned amplification mechanism leads to a pusher movement with a relatively high amplitude, which may, for example, have a magnitude in excess of that of the piezoelectric actuator at relatively low frequencies of several 100 Hz. Along with the supporting structure, the surface actuators are designed or configured in such a way that heat is dissipated efficiently by thermal diffusion to keep the temperature of the piezoelectric actuators as low as possible. The surface actuators are also designed or configured with the support structure to ensure that the structure can achieve high vibration frequencies. The assembly can be operated purely by electrical means, in other words just one (AC) power supply is required, but an offset voltage can be provided to avoid negative voltages. External fluid sources and/or fluid connections and pipes are not required for the device.

The disclosure herein thus provides an actuator assembly with a simple design with high natural frequencies and with good guaranteed heat dissipation. A correspondingly designed or configured support member may be used in this case as a spring element, for example, providing both mechanical path amplification and excellent heat conduction.

Another embodiment of the actuator assembly offers a broader range of options for influencing spatial extension if the at least one opening is designed or configured to be slot-shaped and/or forms a jet, as the fluid flow drawn in and ejected by the assembly extends over an enlarged region of the flow body in the span direction or a fluid flow with an increased mechanical momentum can be ejected to the surrounding fluid.

In this case, in a further embodiment of the actuator assembly, the geometry of the opening may be such that the direction of ejection of the fluid from the cavity through the opening with a general flow direction of the fluid flowing around the flow body includes an angle that is adapted to or can be adapted to the use of the flow body. The resulting asymmetric jet can be adapted accordingly to the flow-influencing application and makes it possible to combine a range of control mechanisms, for example. Thus, it is also possible to directly increase the momentum in the fluid, and influence the boundary layer. Energy is released into the boundary layer, thus stabilising this layer, by the inflow of additional accelerated fluid into the boundary layer on the upper side of the flow body. The boundary layer can therefore flow for longer in a laminar manner against the pressure gradient on the end of the surface directed away from the flow without changing to a turbulent flow. This also affects the ratio of dynamic lift to flow resistance.

In another embodiment of the actuator assembly according to the disclosure herein, the adjustable included angle is between 30° and 60°, for example 45°.

In another embodiment of the actuator assembly according to the disclosure herein, the at least one slot-shaped opening extends substantially along the span direction of the flow body over a portion of this span, with the result that the synthetic flow can always be applied to a region of the flow body with similar depth over the span in this respect. Furthermore, the extension of the slot-shaped opening in the span direction can expediently substantially coincide with the extension of the cavity in this direction so as to achieve a uniform flow over the slot length.

In another embodiment of the actuator assembly with a view to avoiding losses, the geometry of the cavity may be designed or configured such as to avoid flow and pressure losses inside the cavity. In this case, abrupt changes in cross section may, for example, be avoided by optimizing the geometry of the cavity and the jet to such an extent that they are asymmetrical and this asymmetry is adapted to the fluid ejection angle, e.g. by inclining the opening in the direction of flow by a corresponding angle by designing the edge region of the opening accordingly at this same angle and by curving the inner wall of the cavity, thus avoiding corners. In turn, the geometry of the rigid wall portion may be adapted to the cavity and in this case does not form a flat surface, but instead a surface adapted to the cavity and the jet, which may, for example, be curved to a certain extent in the direction of the cavity wall, or in other words may display a cross section with a substantially convex curvature, for example.

In another embodiment of the actuator assembly, the fluid flow entering or leaving the cavity is positively influenced by the fact that the cavity and/or the at least one opening thereof has/have a substantially rectangular longitudinal section and/or the flat extension of the cavity/opening is in each case larger than the extension in the direction of motion of the rigid wall portion.

The above-mentioned measures guarantee a relatively high ejection momentum of the fluid flow/jet at moderate frequencies, which can be achieved by the above-mentioned jet geometry, amongst other things, and also by a high amplitude and a high excitation frequency.

Another idea of the disclosure herein is also achieved in a more general sense by a flow-control device with an actuator assembly described in greater detail by the above-mentioned embodiments and with at least one control device for influencing flow behavior in an active and controllable manner and for example also with a power supply for the drive unit.

Similarly, another idea of the disclosure herein is also achieved by a method for controlling the flow on a flow body, in particular a flow body associated with an airborne apparatus or an aircraft or spacecraft, by an actuator assembly for manipulating a fluid flowing around a flow body, the fluid being received in a volume of at least one cavity arranged in the flow body, and the fluid passing through an opening in the at least one cavity during manipulation of the fluid, the volume of the at least one cavity being able to be changed by moving a wall portion delimiting or defining the cavity at least in part, at least one actuator of a drive unit being coupled to a coupling element connected to the wall portion. A periodic movement over time is executed by the at least one actuator when actuated, the movement causing a translational movement of the wall portion delimiting or defining the cavity and the wall portion is shaped in terms of the topology thereof in such a way that it is adapted to the shape of the at least one cavity with the at least one opening thereof. In the method according to the disclosure herein, the at least one wall portion is designed or configured to be rigid and the wall portion is manipulated indirectly when the at least one actuator is actuated.

The above embodiments and developments can be combined in any conceivable combination as long as this is reasonable. Further possible embodiments, developments and uses of the disclosure herein also include combinations of features of the disclosure herein described previously or below with respect to the embodiments, even if not explicitly specified. In particular, a person skilled in the art will also add individual aspects as improvements or additions to the respective basic forms of the present disclosure.

BRIEF DESCRIPTION OF THE DRAWINGS

The disclosure herein is explained below in greater detail with reference to embodiments in the drawings. The drawings are partial schematic views as follows.

The same elements and devices, or those serving the same function, are provided with the same reference numerals in all the drawings, unless otherwise specified.

DETAILED DESCRIPTION

Figure 1:
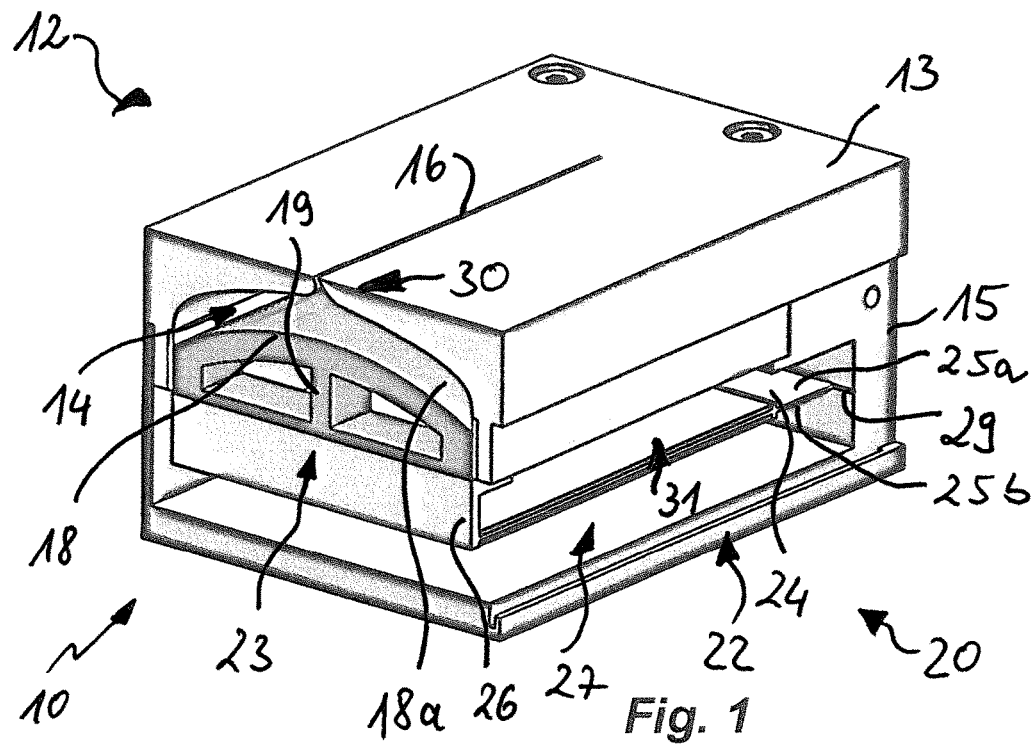
FIG. 1 is a perspective sectional side view of the front side of a flow body from a first embodiment of the actuator assembly according to the disclosure herein, through which side a fluid flows, in which the cross section of the flow body cuts through the flow direction of the fluid and shows the rigid, movable wall portion connected to a support member and arranged therein.

FIG. 1-4 show different views of an actuator assembly for manipulating a fluid, which is not shown in greater detail, flowing around a flow body 12, this entire assembly being denoted by reference sign 10. The fluid firstly flows around the flow body 12, and secondly is received in or may be received in a cavity 14 arranged in the flow body 12. During the manipulation thereof, the fluid passes through an opening 16 in the cavity 14, the volume of the cavity 14 being able to be changed by moving at least one wall portion 18 delimiting or defining the cavity. The actuator assembly 10 has a drive unit 20 with at least one actuator 22, which moves the wall portion 18 delimiting or defining the cavity 14 when actuated. According to the disclosure herein, the wall portion 18 is designed or configured to be rigid and the actuator 22 manipulates the wall portion 18 indirectly when actuated.

Figure 2:
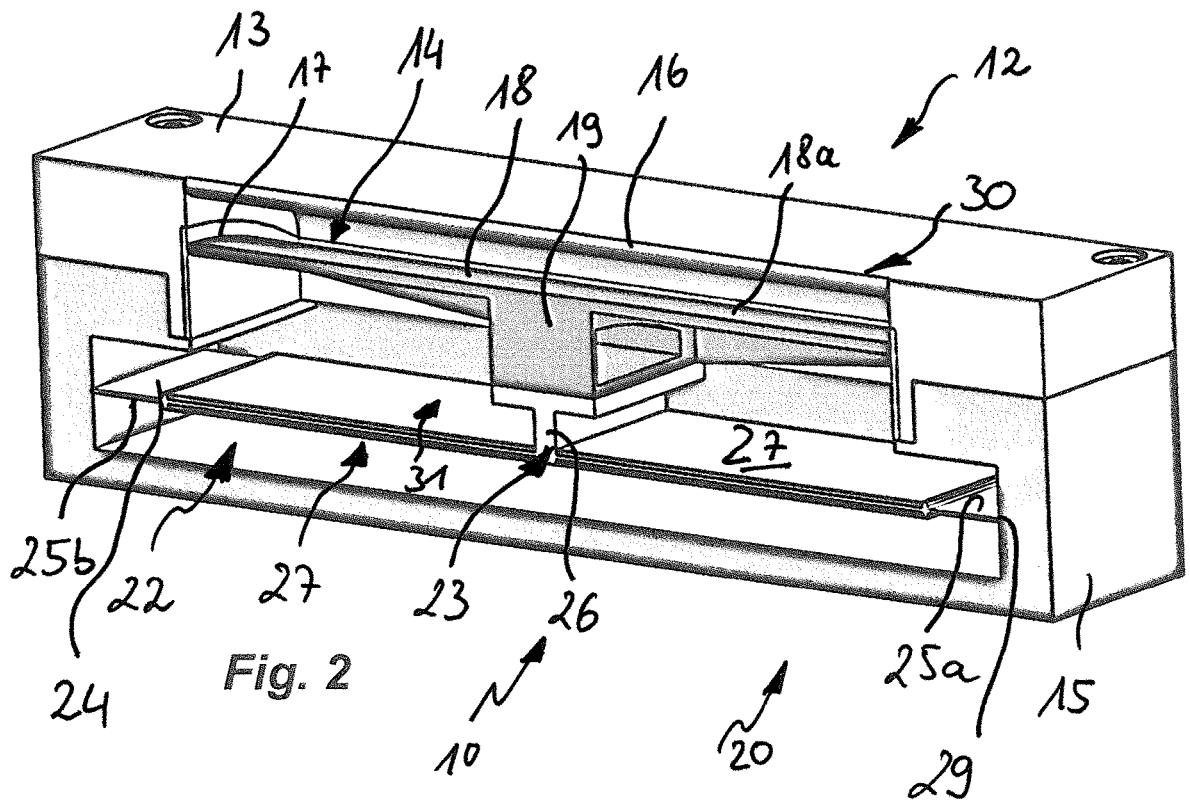
FIG. 2 is a further perspective sectional side view of an embodiment of the actuator assembly according to the disclosure herein as shown in FIG. 1 from a different perspective with a section through the span direction of the flow body.

In each of the views shown in FIGS. 1 and 2, it is possible to see a portion of a flow body 12 inside which there is a cavity 14, as shown in different, sectional views which are perpendicular to one another in one plane. Looking towards the upper side of the flow body 12 facing upwards as viewed by the viewer, the cavity 14 is delimited by the wall-like upper part 13 of a housing 15, and the surrounding fluid can be drawn into, and may also leave, the cavity 14 through a slot-shaped opening 16 extending in the span direction of the flow body 12. In this case, the cavity 14 has an approximately teardrop-shaped profile, the approximately cubic curvature of the inner wall of the upper part of the housing wall 13 delimiting or defining the cavity is approximately recreated by the inner wall 18a of the wall portion 18 also forming a limit of the cavity 14, with the result that the contour of the wall portion 18 is curved in the direction of the inside of the cavity, and the wall portion 18 is accordingly shaped in terms of the topology thereof in such a way that it is adapted to the shape of the at least one cavity 14 with the at least one opening 16 thereof.

The slot arranged in the upper part 13 as an opening 16 forms an angle of approximately 45° from the general direction of the fluid flowing around the flow body 12, although the angle may also be designed or configured to be different depending on the purpose for which the flow-control device is used. The wall portion 18 is rigid and provided in the cavity 14 in such a way that it can move so that fluid from the flow around the flow body 12 can be drawn into the cavity 14 and then ejected from this cavity again afterwards. The edges of the wall portion 18 should in this case be provided with a sealant 17 to seal the cavity 14.

The movement of the wall portion 18, which moves substantially transversely to both the span direction and to the general flow direction of the fluid, originates from the connection with a support member 24, the connection being created by a flange-like connection portion 26 with a T-shaped profile as a connector, the connection portion being connected to the support structure 19 of the wall portion 18 facing away from the cavity 14, in such a way that deformation of the flat support member 24 and amplification thereof can be converted into a movement of the wall portion 18. On both sides of the web of the connection portion 26, the support member 24 extends in parallel with the belt of the web in the span direction in each case.

The flat surfaces 25a, 25b of each wing of the support member 24, the surfaces facing away from but being adjacent to one another, each extend in parallel with one another between the web of the connection portion 26 and the adjacent housing wall in the span direction, the edge of the surfaces being able to be inserted in a groove 29 in the housing wall, as a result of which the ends of the support member 24 are fixed or clamped. In this process the piezo-elements are also attached in a flat manner onto a support structure. Limiting elements may also be used as an option to reduce or avoid shear stresses at the ends of the ceramic piezoelements. In this case, the majority of the span of each surface 25a, 25b is covered by a piezoelectric surface actuator 27, and, when actuated, causes the support member 24 as a whole to be deformed in such a way that the wall portion 18 is displaced perpendicularly to the direction of excitation of the surface actuators 27. Each of the surface actuators 27 is composed of a plurality of piezoelectric actuators 31 arranged next to one another on the flat surface. Piezoelectric actuators 31 arranged on surfaces 25a, 25b with surface normals aligned in the same direction and the corresponding surface actuators 27, as a result, or in other words, all actuators 31 on the surfaces facing the cavity 14, for example, are excited in the same actuation direction, whereas the actuators 22 arranged on the surfaces facing in the opposite direction are excited in the opposite direction (offset), resulting in an overall amplification effect with regard to the force applied indirectly to the wall portion 18, resulting in an amplitude of the movement which is approximately one magnitude higher than the amplitude of the individual surface actuators 27 formed by piezoelectric actuators 31.

Figure 3:
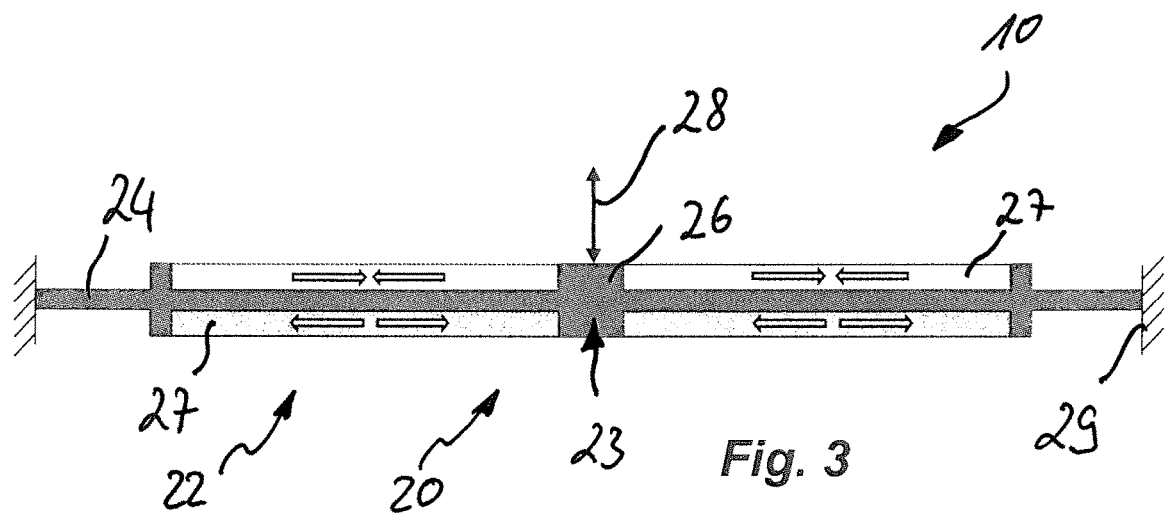
FIG. 3 is a schematic, flat sectional side view of another embodiment of the actuator assembly with a support member and surface actuators arranged on the support member.

This situation can also be seen directly in FIG. 3, which shows the surface actuators 27 composed of actuators 22 arranged on the surfaces 25a, 25b of the support member 24, which is clamped at the ends thereof, in greater detail. The situation illustrated in FIG. 3 shows that the surfaces 25a, 25b of the support member 24 extend between the grooves 29 and the web of the connection portion 26 and the majority of the span thereof is completely covered by surface actuators 27, which contract on the upper surface 25a, whereas they expand on the lower surface 25b, thus causing a movement along the direction of motion illustrated by the arrow 28. To reverse this movement, the excitation directions of the surface actuators 27 are reversed, resulting in a periodic movement over time of the rigid wall portion 18 between an upper displacement point and a lower displacement point 21a, 21b over time.

Figure 4:
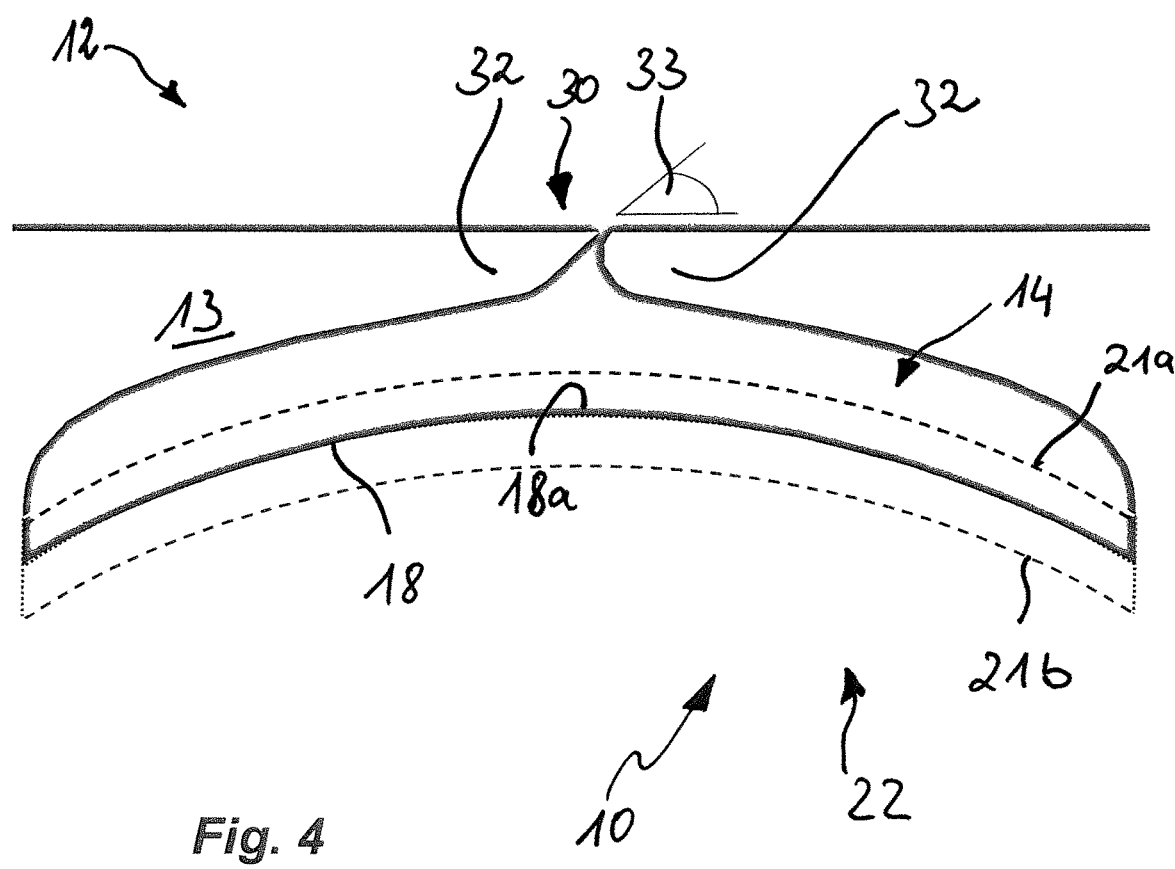
FIG. 4 is a flat sectional side view of another embodiment of the actuator assembly according to the disclosure herein, clearly showing the geometry of the slot-shaped opening and the cavity and the flow angle of the fluid as a result of the geometric circumstances.

FIG. 4 illustrates this movement of the rigid wall portion 18 inside the cavity 14 for the benefit of the viewer more clearly, as it shows the two displacement points 21a, 21b for the movement as dashed lines, with the curved inner wall 18a, facing the cavity 14, of the wall portion 18 of the actuator assembly 10 being visible between these lines. The curvature of the inner wall 18a of the upper part 13 of the housing 15 corresponding to the curve of the inner wall is also evident. The viewer can see the slot-like opening 16 extending into the plane of view approximately in the middle of the upper part 13. Finally, it is clear that the fluid enters and/or is ejected from the cavity 14 at an angle inclined against the general fluid flow direction of the fluid flowing around the flow body 12 as a result of the design of the edge regions of the slot-like opening 16, which face one another, leading to an effective flow control by the actuator assembly 10. The fluid entrance and outlet at an angle 33 is achieved by the design of the edge region 30 of the slot-shaped opening 16, which is provided with edge pieces in the form of shoulders 32, which form the relevant required angle 33, although the edge region 30 itself is in turn designed or configured to be free from edges or discontinuities on the portions thereof facing the inside of the cavity 14.

The disclosure herein described above accordingly relates to an actuator assembly 10 for manipulating a fluid flowing around a flow body 12, the fluid being received or able to be received in a volume of at least one cavity 14 arranged in the flow body, and the fluid passing through at least one opening 16 in the cavity 14 during manipulation of the fluid. In this process, the volume of the at least one cavity 14 can be changed by moving at least one wall portion 18 delimiting or defining the cavity. The actuator assembly 10 has a drive unit 20 with at least one actuator 22, which moves the at least one wall portion 18 delimiting or defining the cavity 14 when actuated. To ensure a compact, robust, reliable and low-loss flow control with the actuator assembly 10 with minimal outlay, the at least one wall portion 18 is designed or configured to be rigid and the at least one actuator 22 executes a periodic movement over time when actuated, the movement in turn causing a translational movement of the wall portion 18 (the wall portion 18 is thus manipulated indirectly by the actuator 22 as a result of the coupling element), which is shaped in terms of the topology thereof in such a way that it is adapted to the shape of the at least one cavity 14 with the at least one opening 16 thereof.

The above-mentioned actuator assembly 10 forms a flow-control device which can be operated entirely by electrical means, and in which a fluid supply is not required. The optimized jet shape used in this assembly 10 is very efficient, and in some cases, if the coupled system has a low natural frequency, further resonance effects may also be utilised. The actuator assembly 10 also has the advantage of forming or taking up a compact installation space and representing a system that can be miniaturized.

Although the present disclosure has been described above with reference to various embodiments, it is not restricted to the embodiments, but may be modified in many ways, in particular by the above-mentioned influencing parameters such as the design of the actuator, the geometry of the cavity and the jet, and interaction between these parameters.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An actuator assembly for manipulating a fluid flowing around a flow body, part of the fluid being receivable in a volume of at least one cavity arranged in the flow body, and the fluid passing through at least one opening in the cavity during manipulation of the fluid,
the volume of the cavity being changeable by moving a wall portion defining the cavity at least in part, comprising:
a drive unit with at least one actuator; and
a coupling element connecting the at least one actuator to the wall portion,
the at least one actuator executing a periodic movement over time when actuated, and
the periodic movement causing a translational movement of the wall portion defining the cavity,
wherein the wall portion is topologically shaped to correspond to a shape of the cavity, such that a distance between the wall portion and an edge region of the cavity is always less than a distance between the wall portion and a region of the opening.

2. The actuator assembly of claim 1, wherein the wall portion is a substantially rigid structure.

3. The actuator assembly of claim 1, wherein the periodic movement of the at least one actuator ejects the fluid more quickly than the at least one actuator draws in the fluid.

4. The actuator assembly of claim 3, wherein an ejection speed exceeds a suction speed by at least 10%.

5. The actuator assembly of claim 1, wherein the at least one actuator of the drive unit comprises at least one support member coupled to the coupling element, or a region of a support member forms the coupling element or a coupling point.

6. The actuator assembly of claim 5, wherein the support member comprises at least one flat surface, on which a surface actuator or a plurality of surface actuators are formed.

7. The actuator assembly of claim 6, wherein the surface actuators are respectively formed on surfaces positioned opposite and adjacent to one another on both sides of a flat support member, the surface actuators covering a majority of the surfaces associated with the surface actuators.

8. The actuator assembly of claim 1, wherein the coupling element is coupled to a coupling point on the at least one actuator, which covers a maximum amplitude of the periodic movement.

9. The actuator assembly of claim 1, wherein the at least one actuator is configured to be driven electrically and comprises at least one piezoelectric actuator or a plurality of piezoelectric actuators.

10. The actuator assembly of claim 1, wherein the at least one actuator has a direction of motion which is oriented perpendicularly to a direction of action of the wall portion.

11. The actuator assembly of claim 1, wherein the opening of the cavity is slot-shaped.

12. The actuator assembly of claim 1, wherein the opening forms a jet.

13. The actuator assembly of claim 1, wherein a geometry of the opening is such that a direction of ejection of the fluid from the cavity through the opening is at an inclined angle to a general flow direction of the fluid flowing around the flow body.

14. The actuator assembly of claim 13, wherein the inclined angle is between approximately 30° and 60°.

15. The actuator assembly of claim 11, wherein the slot-shaped opening extends along a span direction of the flow body for at least a portion of the span of the flow body.

16. The actuator assembly of claim 11, wherein an extension of the slot-shaped opening is in a span direction and substantially coincides with an extension of the cavity in the span direction.

17. The actuator assembly of claim 1, wherein at least one of the at least one cavity and the at least one opening in the cavity has a substantially rectangular longitudinal section.

18. The actuator assembly of claim 1, wherein a flat extension of the opening or the cavity is in each case larger than an extension thereof in a direction of motion of the wall portion.

19. A flow-control device with an actuator assembly for manipulating a fluid flowing around a flow body, part of the fluid being receivable in a volume of at least one cavity arranged in the flow body, and
the fluid passing through at least one opening in the at least one cavity during manipulation of the fluid, the volume of the at least one cavity being changeable by moving a wall portion defining the cavity at least in part, comprising:

a drive unit with at least one actuator;

a coupling element connecting the actuator to the wall portion;

the at least one actuator executing a periodic movement over time when actuated;

the periodic movement causing a translational movement of the wall portion defining the cavity and the wall portion being shaped in terms of a topology thereof such that the wall portion adapts to a shape of the at least one cavity with the at least one opening thereof; and with at least one control device for actively and controllably influencing flow behavior.

20. A method for flow control on a flow body associated with an airborne apparatus or an aircraft or spacecraft, with an actuator assembly for manipulating a fluid flowing around the flow body, the fluid being received in a volume of at least one cavity arranged in the flow body, and the fluid passing through an opening in the at least one cavity during manipulation of the fluid, the volume of the at least one cavity being changeable by moving a wall portion defining the cavity at least in part, at least one actuator of a drive unit being coupled to a coupling element connected to the wall portion, the at least one actuator executing a periodic movement over time when actuated, the movement causing a translational movement of the wall portion defining the cavity and the wall portion being shaped in terms of a topology thereof such that the wall portion is adapted to a shape of the at least one cavity with the at least one opening thereof.

21. The actuator assembly of claim 3, wherein the ejection speed exceeds the suction speed by 10%-50%.

22. The actuator assembly of claim 13, wherein the inclined angle is approximately 45°.

\* \* \* \* \*